US006796321B2

United States Patent
Vicars

(12) United States Patent
(10) Patent No.: US 6,796,321 B2
(45) Date of Patent: Sep. 28, 2004

(54) PRESSURE RELIEF VALVE

(75) Inventor: Berton L. Vicars, Odessa, TX (US)

(73) Assignee: Garnder Denver, Inc., Quincy, IL (US)

( * ) Notice: Subject to any disclaimer, the term of this patent is extended or adjusted under 35 U.S.C. 154(b) by 147 days.

(21) Appl. No.: 10/173,669

(22) Filed: Jun. 19, 2002

(65) Prior Publication Data

US 2003/0234049 A1 Dec. 25, 2003

(51) Int. Cl.[7] .............................................. F16K 17/14
(52) U.S. Cl. ........................ 137/70; 137/467; 137/512.1
(58) Field of Search ....................... 137/70, 467, 512.1, 137/540, 843, 903

(56) References Cited

U.S. PATENT DOCUMENTS

| | | | | |
|---|---|---|---|---|
| 661,603 A | * | 11/1900 | Gold | ........................... 137/903 |
| 2,143,399 A | * | 1/1939 | Abercrombie | .............. 137/540 |
| 2,587,933 A | | 3/1952 | Volpin | |
| 3,443,572 A | | 5/1969 | Laviene, Jr. et al. | |
| 4,286,662 A | | 9/1981 | Page, Jr. | |
| 4,551,077 A | | 11/1985 | Pacht | |
| 4,787,409 A | * | 11/1988 | Taylor | ........................ 137/70 |
| 4,896,689 A | * | 1/1990 | Taylor | ........................ 137/70 |
| 4,930,536 A | | 6/1990 | Taylor | |
| 5,362,215 A | | 11/1994 | King | |
| 5,794,915 A | * | 8/1998 | Shimizu et al. | .............. 137/540 |
| 5,924,853 A | | 7/1999 | Pacht | |
| 6,129,116 A | * | 10/2000 | Laskowski | .................. 251/127 |
| 6,155,284 A | | 12/2000 | Scantlin | |

* cited by examiner

Primary Examiner—John Rivell
(74) Attorney, Agent, or Firm—James B. Conte; Barnes & Thornburg

(57) ABSTRACT

A pressure relief valve including a valve seat and a valve seat retainer abutting the valve seat. The valve seat has a central channel whereas the valve seat retainer has a number of peripheral channels. A deformable plug is positioned between the valve seat and the valve seat retainer. The deformable plug has a head abutting the valve seat and normally blocking the central channel and a tail abutting the valve seat retainer at a location between the peripheral channels. The tail deforms upon receiving a predetermined load from the head thereby permitting the head to unblock the central channel and open the pressure relief valve.

8 Claims, 3 Drawing Sheets

PRESSURE RELIEF VALVE

FIELD OF THE INVENTION

The present invention relates generally to fluid handling apparatus and, in particular, destructible or deformable element controlled valves.

BACKGROUND OF THE INVENTION

It is difficult to produce oil and gas in an economic manner from low permeability reservoir rocks. Production rates are often boosted by resorting to hydraulic fracturing, a technique that increases rock permeability by opening channels through which hydrocarbons can flow to recovery wells. During hydraulic fracturing, a fluid is pumped into the earth under high pressure where it enters a reservoir rock and fractures it. Proppants are carried in suspension by the fluid into the fractures. When the pressure is released, the fractures partially close on the proppants, leaving channels for oil and gas to flow.

Specialized pumps are used to develop the pressures necessary to complete a hydraulic fracturing procedure or "frac job." These pumps are usually provided with so-called fluid ends within which reciprocating plungers place frac fluids under pressure. On rare occasions, enough proppant can become trapped or captured within a fluid end to block the flow of fluid from it, sometimes leading to catastrophic pump failure. A need exists, therefore, for a product that will prevent the buildup of excessive pressures within the fluid end of a pump in the event of a flow blockage.

SUMMARY OF THE INVENTION

In light of the problems associated with conventional oilfield pumping equipment, it is a principal object of the present invention to provide a pressure relief valve that can be easily installed in the fluid end of a conventional, high-pressure pump to vent fluids in the event that pressures exceeding a predetermined threshold are reached. The preferred pressure relief valve permits the pressure threshold to be set by a user so as to ensure maximum safety in any operating environment.

It is another object of the invention to provide a pressure relief valve of the type described that can be readily sized for installation in fluid ends of numerous makes and models. The pressure relief valve can also be installed and serviced with minimal training and with conventional tools. Should the pressure relief valve ever open to relieve pressures in an abnormal situation, it can be rapidly returned to use with the replacement of an expendable part.

It is a further object of the invention to provide a pressure relief valve whose fluid discharge can be directed into an area selected by a user.

It is an object of the invention to provide improved elements and arrangements thereof in a pressure relief valve for the purposes described that is lightweight, inexpensive to manufacture, and fully dependable in use.

Briefly, the pressure relief valve in accordance with this invention achieves the objects noted above by featuring a cage for positioning within a passageway connecting an area of high pressure with an area of low pressure. The cage includes a valve seat having a central channel open to the area of high pressure and a valve seat retainer abutting the valve seat and having a plurality of peripheral channels open to the area of low pressure. The central channel is normally blocked by the head of a deformable plug positioned within the cage between the valve seat and the valve seat retainer. A hollow, bulbous tail extends from the head and abuts the valve seat retainer. Deformation of the tail moves the head away from the seat thus permitting fluid to move from the area of high pressure through the central and peripheral channels to the area of low pressure. A deflector is carried by the valve seat retainer to direct the flow of fluid from the peripheral channels into the area of low pressure.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 2:
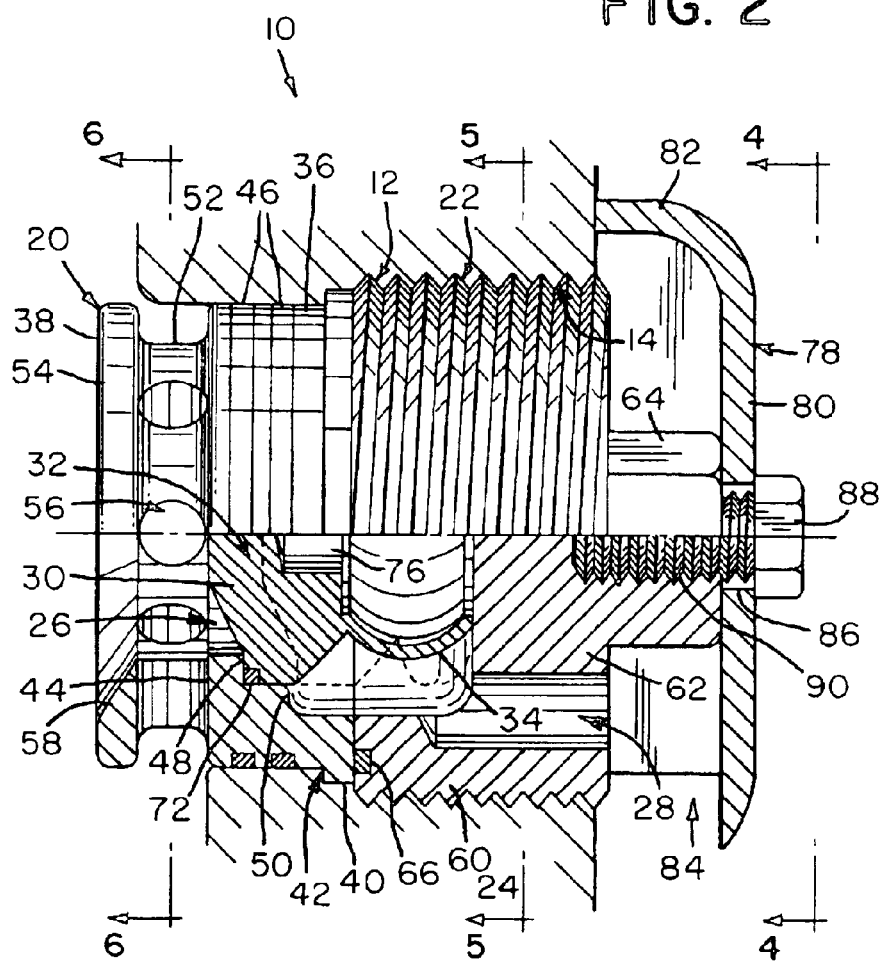
FIG. 2 is an enlarged cross-sectional view of the pressure relief valve of FIG. 1.
Figure 3:
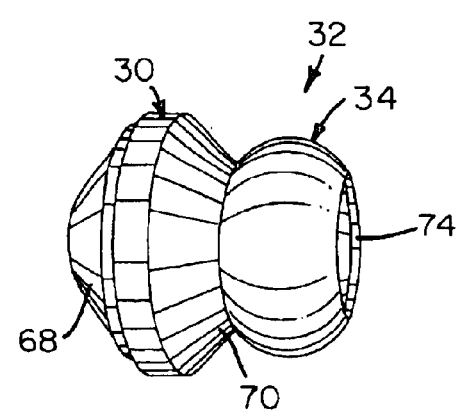
FIG. 3 is a perspective view of deformable plug forming part of the pressure relief valve.
Figure 4:
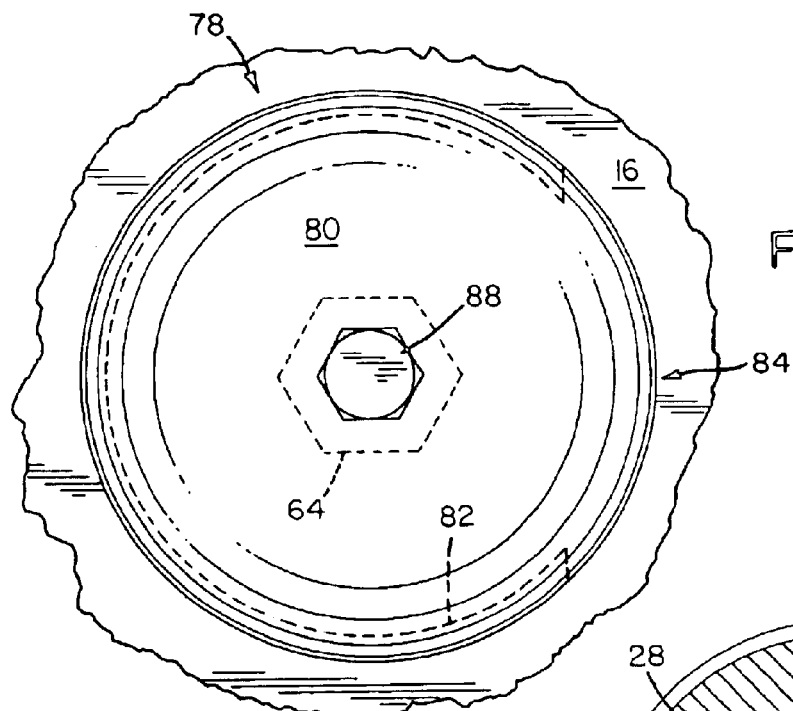
FIG. 4 is a side elevational view taken along line 4—4 of FIG. 2.
Figure 5:
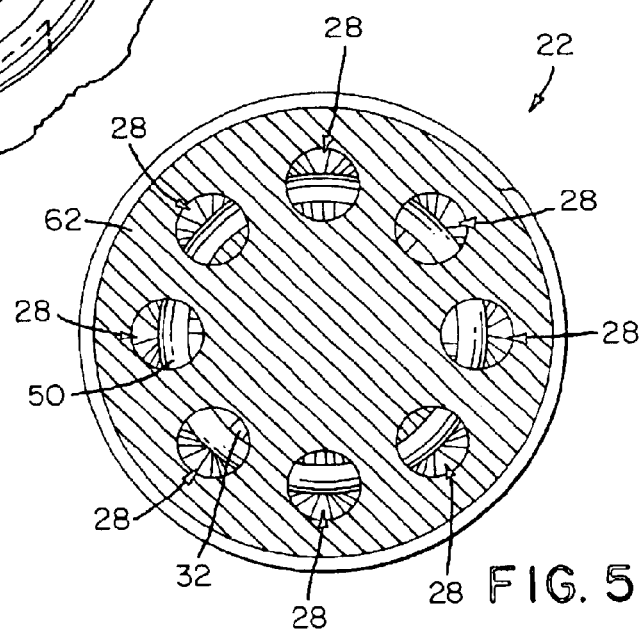
FIG. 5 is a cross-sectional view taken along line 5—5 of FIG. 2.
Figure 6:
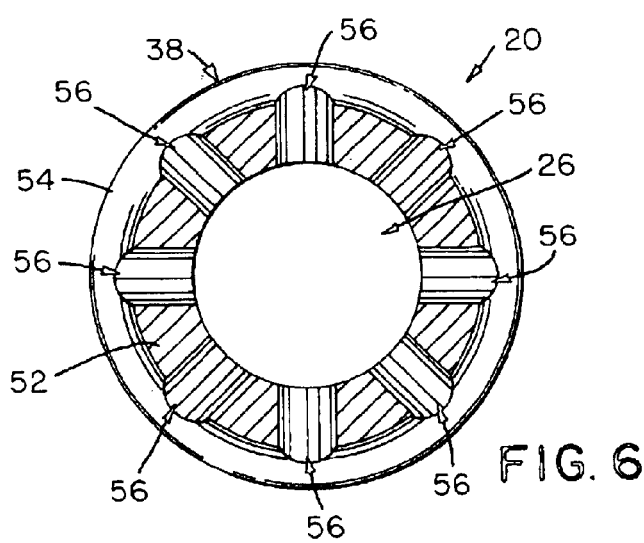
FIG. 6 is a cross-sectional view taken along line 6—6 of FIG. 2.

A pressure relief valve in accordance with the present invention is shown at 10. Pressure relief valve 10 includes a cage 12 for positioning within a passageway 14 in a fluid end 16 connecting a pumping chamber 18, i.e., an area of high pressure, with the atmosphere, i.e., an area of low pressure. Cage 12 includes a valve seat 20 and an abutting valve seat retainer 22 that together define an interior cavity 24. Access to cavity 24 is provided by means of a central channel 26 in valve seat 20 that opens to pumping chamber 18 and by means of a plurality of peripheral channels 28 in valve seat retainer 22 that open to the atmosphere. Central channel 26 is normally blocked by the head 30 of a deformable plug 32 positioned within cavity 24. A hollow, bulbous tail 34 extends from head 30 and abuts valve seat retainer 22. Should a preset pressure differential be reached between pumping chamber 18 and the atmosphere, the force exerted on head 30 will cause tail 34 to buckle thereby permitting head 30 to move away from valve seat 20 as shown by broken lines in FIG. 2. Fluid in pumping chamber 18 is then free to flow through cavity 24, and channels 26 and 28 to the atmosphere.

Valve seat 20 includes a primary cylinder 36 for engaging head 30 of plug 32 and a secondary cylinder 38 for distributing pressure surges generated in pumping chamber 18 evenly across head 30. As shown, primary cylinder 36 includes an outwardly extending peripheral flange 40 at its inner end for abutting a valve seat deck 42 of corresponding shape in passageway 14 and an inwardly extending peripheral flange 44 at its outer end. A pair of O-rings 46 in primary cylinder 36 adjacent flange 40 ensures a fluid-tight seal within passageway 14. A circumferential groove 48 in peripheral flange 44, however, snugly receives head 30 and defines a shoulder 50 spacing the side of head 30 from the side of cavity 24.

Secondary cylinder 38 includes a neck 52 extending outwardly from primary cylinder 36 and a peripheral rim 54 at the free end of neck 52. Neck 52 has a number of radial openings 56 that permit fluid to readily pass from the interior to the exterior of secondary cylinder 38. An inwardly beveled surface 58 on peripheral rim 54 directs fluid into the interior of secondary cylinder 38.

Neck 52 is provided with an outer diameter that is less than that of primary cylinder 36 and peripheral rim 54. This area of reduced diameter permits fluids entering secondary cylinder 38 through its open outer end to be jetted radially away from head 30 with minimal frictional losses thereby ensuring that pressures are not concentrated on any side of head 30 or in any portion of pumping chamber 18. It is believed, over time, that the application of uneven pressure loads to head 30 could result in fluid leakage around head 30 and through relief valve 10. Of course, the circulatory action of fluids through and around neck 52 ensures that any solids carried by fluids in pumping chamber 18 will remain in suspension and not become lodged against head 30 thereby impeding its action.

Valve seat retainer 22 comprises a major cylinder 60 whose outer end is closed by an integral cap 62. The exterior of cylinder 60 is threaded so that it may be screwed into a correspondingly threaded portion of passageway 14. To facilitate the turning of cylinder 60 to remove such from passageway 14 by means of a wrench (not shown), an outwardly projecting, hexagonal fitting 64 is provided to the center of cap 62. Peripheral channels 28 penetrate cap 62 about hexagonal fitting 64 and place cavity 24 in fluid communication with the atmosphere. To ensure that channels 28 cannot become completely blocked by deformed plug 32 when pressure relief valve 10 is open, channels 28 are as widely spaced as possible from the center of cap 62 and partially penetrate major cylinder 60. An O-ring 66 in the inner end of major cylinder 60 ensures a fluid-tight seal against valve seat 20.

Deformable plug 32 comprises head 30 and tail 34 integrally formed with, and extending from, head 30. Head 30 is a disk whose load-bearing surface 68 and reinforcing surface 70 are conical and bulge outwardly from the center of the disk so as to permit fluids to easily flow around head 30 when head 30 is disengaged from valve seat 20. An O-ring 72 about the periphery of surface 68 of head 30 ensures a fluid-tight seal against valve seat 20 in groove 48. Tail 34, however, is a hollow bulb that is open at its free end 74. The free end 74 of tail 34 normally engages the center of cap 62 of valve seat retainer 22 remote from peripheral channels 28 and presses head 30 into groove 48 of valve seat 20 providing a fluid-tight seal. The diameter and thickness of tail 34 are variable, depending on pressure differential threshold desired for opening pressure relief valve 10. To reduce weight, a hollow 76 may be formed in the surface 70 of head 30 that opens into tail 34.

Shapes other than open-ended bulbs could be incorporated into tail 34. Cones, cylinders and rods, to name a few, are all possibilities. Unlike bulbs, however, such were not found to collapse evenly and completely so as to not block peripheral channels 28 in valve seat retainer 22. Furthermore, such were not found to collapse within the close tolerance ranges required by pressure relief valve 10.

A deflector 78 is carried by valve seat retainer 22 to direct the flow of fluid from peripheral channels 28 when pressure relief valve 10 is open. Deflector 78 includes a bowl 80 having a rim 82 with a height substantially equal to that of hexagonal fitting 64 and a notch 84 formed therein serving as a spray nozzle. Rim 82 is oriented so that it points toward cage 12 and the area of high pressure.

A bore 86 in the center of bowl 80 permits the passage of a threaded fastener 88 into a correspondingly sized threaded aperture 90 in hexagonal fitting 64 in valve seat retainer 22. Not only does fastener 88 releasably secure bowl 80 to cage 12, but, by selectively loosening and retightening fastener 88, notch 84 may be oriented within a wide, 360° range about fastener 88. Thus, fluids emitted from pressure relief valve 10 may be sprayed from notch 84 upwardly, downwardly or laterally as conditions dictate.

Although pressure relief valve 10 could be used in conjunction with pressure vessels and equipment of various types, it is anticipated that pressure relief valve 10 would find immediate application within the fluid end 16 of a high-pressure pump. Fluid end 16 includes at least one horizontal passageway 14 for receiving a reciprocating plunger 92 at one of its ends and a pressure relief valve 10 at the other of its ends. A vertical passageway 94 intersects passageway 14 to define pumping chamber 18 at their intersection. Vertical passageway 94 contains a suction valve 96 beneath chamber 18 and a discharge valve 98 above chamber 18. A suction manifold 100 is attached to the bottom of fluid end 16 to provide a flow of fluid into chamber 18 via suction valve 96. A discharge passage 102 intersects vertical passage 94 and receives fluid pressurized by plunger 92 via discharge valve 98 and ports such from fluid end 16.

Figure 1:
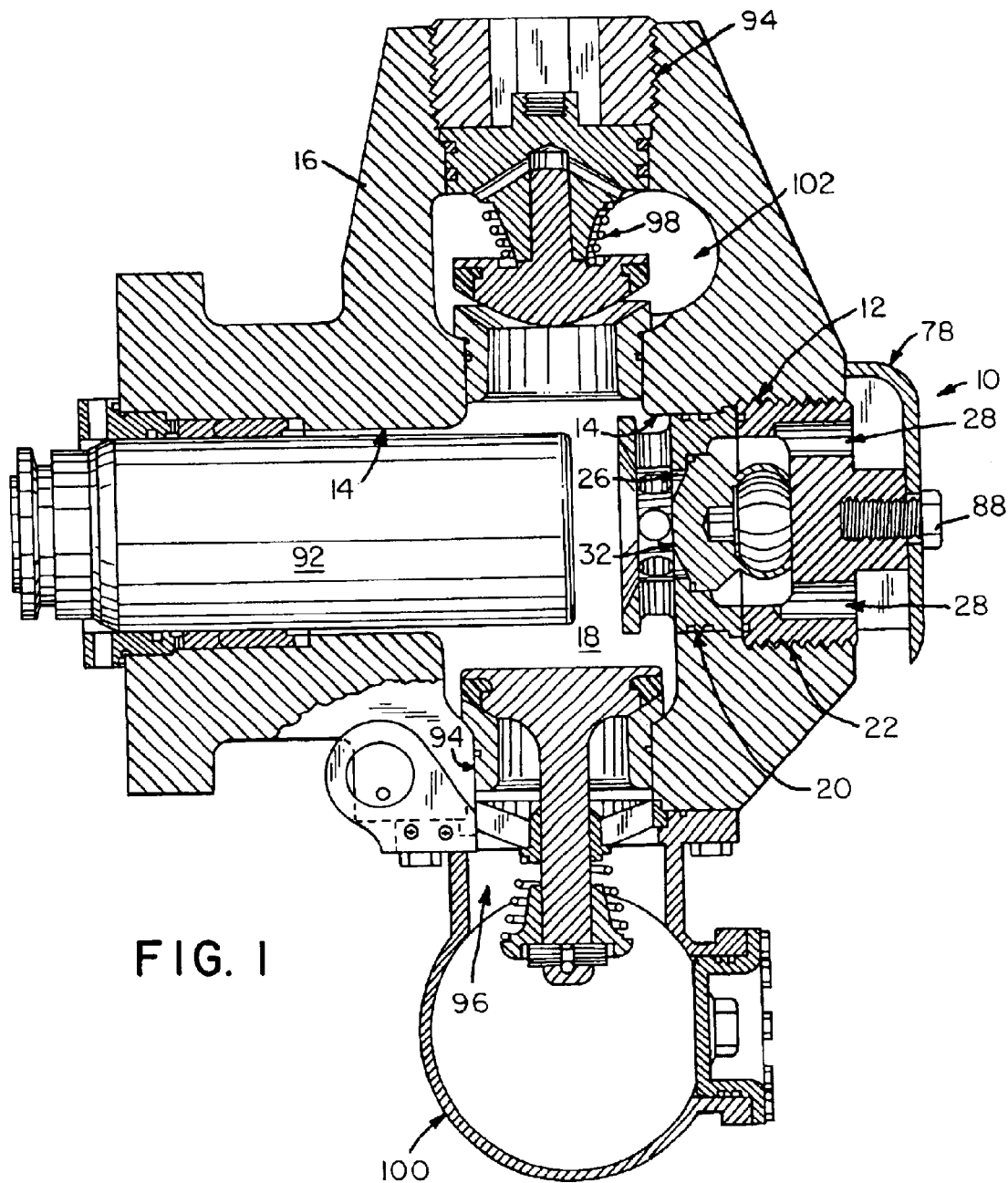
FIG. 1 is a cross-sectional view of a fluid end of a pump having a pressure relief valve in accordance with the present invention.

From the foregoing, it will be appreciated that use of pressure relief valve 10 is straightforward. First, pressure relief valve 10 is installed within the fluid end 16 of a pump as shown in FIG. 1 and plunger 92 is caused to reciprocate thereby moving fluid from manifold 100, through valve 96, into pumping chamber 18 where the fluid is pressurized, past valve 98, and from passage 102 where it can be conveyed by suitable conduits (not shown) to a location where needed. A blockage of valve 98 or passage 102 will cause the fluid pressure in pumping chamber 18 to increase.

The front surface of the head 30 of plug 32, being exposed to pumping chamber 18, will transmit the imparted load to tail 34. Should the load exceed the yield point of tail 34, tail 34 will evenly flatten or collapse thereby opening pressure relief valve 10. Fluid may now pass from pumping chamber 18 through cage 12 and out to the atmosphere. The direction that the fluid is sprayed from pressure relief valve 10 is determined in advance by appropriately adjusting the positioning of the notch 84 in deflector bowl 80. Of course, the spraying of fluid from valve 10 can be easily detected by the operator who can shut down the associated pump. Catastrophic damage to fluid end 16 is usually avoided if the operator acts with reasonable prudence.

Pressure relief valve 10 can be continuously reused. To do so, an operator need only unscrew valve seat retainer 22 from passageway 14 and replace the deformed plug 32 that permitted pressure relief valve 10 to open with a new, undeformed plug 32. After repositioning valve seat retainer 22 and deflector 78, fluid end 16 can be reenergized. The process requires only a few minutes to complete after which, provided the blockage that caused pressure relief valve 10 to open is cleared, fluid end 16 can be reenergized.

While the invention has been described with a high degree of particularity, it will be appreciated by those skilled in the art that modifications may be made thereto. For example, the configuration of the head 30 of plug 32 can be made either as a flat plate for easy manufacturing or may be made even more streamlined to further enhance the ability of pressure relief valve 10

I claim:

1. A pressure relief valve, comprising:
   a valve seat having a central channel;
   a valve seat retainer abutting said valve seat and having a major cylinder, a cap, and a plurality of peripheral channels;
   a deformable plug contained entirely within said major cylinder positioned between said valve seat and said cap valve seat retainer, said deformable plug including:
   a head abutting said valve seat and normally blocking said central channel; and,
   a tail extending from said head and abutting said valve seat retainer at a location
   between said peripheral channels, and said tail being capable of
   deforming upon receiving a predetermined load from said head thereby permitting said head to move away from said valve seat and unblock said central channel.

2. The pressure relief valve according to claim 1 wherein said tail is a hollow bulb.

3. The pressure relief valve according to claim 1 further comprising a bowl with a notched rim pivotally secured to said valve seat retainer for deflecting fluids passed through said peripheral channels.

4. A pressure relief valve, comprising:
   a cage for positioning within a passageway connecting an area of high pressure with an area of low pressure, said cage including:
   an interior cavity;
   a central channel for placing said interior cavity and said area of high pressure in fluid communication; and,
   a plurality of peripheral channels for placing said interior cavity in fluid communication with said low area of pressure;
   a one-time deformable plug positioned within said interior cavity, said one-time deformable plug including:
   a head abutting said cage and normally blocking said central channel; and,
   a tail extending from said head and abutting said cage at a location between said
   peripheral channels, and said tail being capable of deforming once upon receiving a
   predetermined load from said head thereby permitting said head to move away from said
   cage and unblock said central channel.

5. The pressure relief valve according to claim 4 wherein said tail is a hollow bulb.

6. The pressure relief valve according to claim 4 further comprising a bowl with a notched rim pivotally secured to said cage for deflecting fluids passed through said peripheral channels.

7. A pressure relief valve, comprising:
   a valve seat having a central channel;
   a valve seat retainer abutting said valve seat and having a plurality of peripheral channels;
   a one-time deformable plug positioned between said valve seat and said valve seat retainer, said one-time deformable plug including:
   a head abutting said valve seat and normally blocking said central channel, said head including:
   a conical, load-bearing surface abutting said valve seat; and
   a conical, reinforcing surface opposite said load-bearing surface; and,
   a hollow, bulbous tail integrally formed with said head and extending therefrom, said tail abutting said valve seat retainer at a location between said peripheral channels, and said tail being capable of deforming once upon receiving a predetermined load from said head thereby permitting said head to move away from said valve seat and unblock said central channel.

8. The pressure relief valve according to claim 7 further comprising a bowl with a notched rim pivotally secured to said cage for deflecting fluids passed through said peripheral channels.

* * * * *